Jan. 25, 1949.    D. C. WARREN    2,459,981
SWIVEL JOINT
Filed April 20, 1945
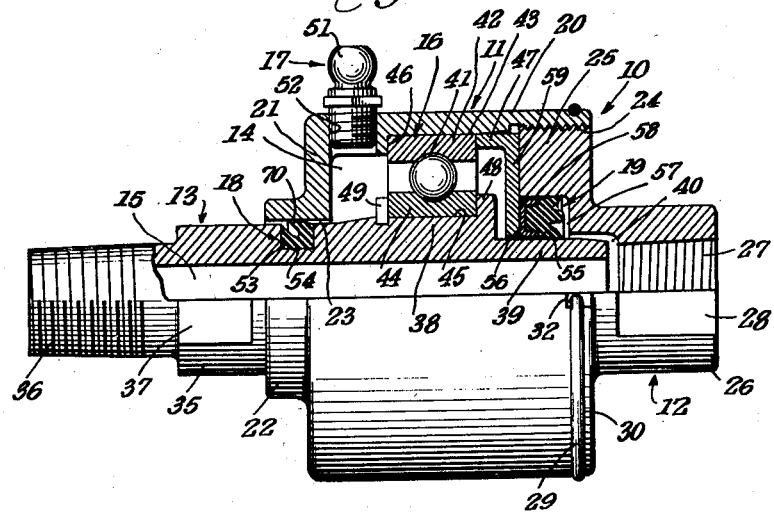
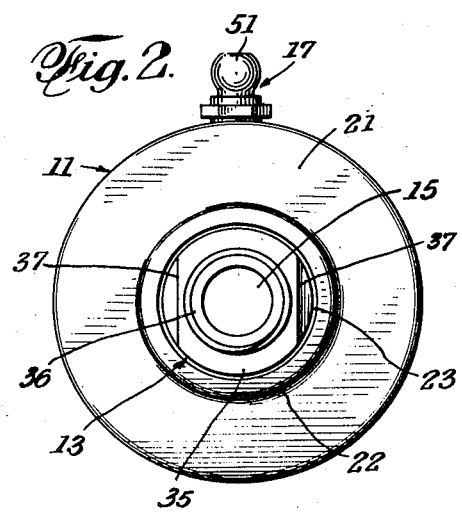
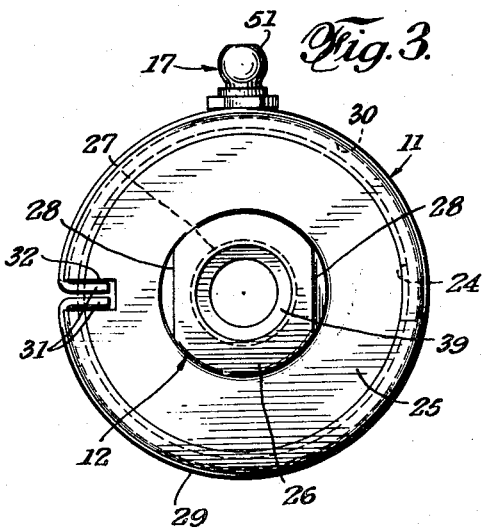
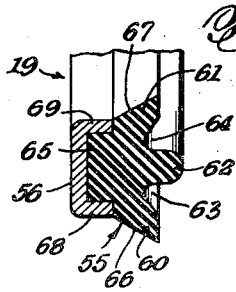
INVENTOR
DOYLE C. WARREN
BY
ATTORNEY Patented Jan. 25, 1949

2,459,981

UNITED STATES PATENT OFFICE 2,459,981

SWIVEL JOINT

Doyle C. Warren, Monrovia, Calif., assignor to Chiksan Company, Brea, Calif., a corporation of California Application April 20, 1945, Serial No. 589,428

2 Claims. (Cl. 285—97.3)

This invention relates to swivel joints and deals more particularly with high speed hydraulic swivel joints. An object of this invention is to provide a simple practical and leak-proof swivel joint of the character indicated.

Another object of the invention is to provide a swivel joint in which the relatively rotational components of the joint are freely rotational under varying conditions of fluid pressure in the joint.

Another object of my invention is to provide a swivel joint in which simple and effective packing is provided for sealing anti-friction means which interconnect the relatively rotational components of the joint from both the fluid in the joint and escape of lubricant for said anti-friction means.

Another object of my invention is to provide a swivel joint embodying simple and novel arrangement of sealing means cooperating with the relatively rotating components of the joint and acting to prevent fluid in the joint from reaching and deleteriously affecting the anti-friction means that is incorporated in the joint.

A further object of my invention is to provide a packing sealed substantially frictionless swivel joint in which the joint components are allowed a slight amount of relative angular movement with respect to the longitudinal axis of the joint whereby the joint is rendered flexible in use to accommodate angular stresses and forces upon the components.

A still further object of my invention is to provide a swivel joint having only one interconnecting bearing means affording free and easy relative rotation of the joint components.

A still further object of my invention is to provide a swivel joint having an interconnecting bearing for the relatively rotational components of the joint around which a generous supply of lubricant can be placed to afford long untended use of the joint.

The various objects and features of my invention will be more fully understood from the following detailed description of a typical, preferred form and application of the invention, throughout which description reference is made to the accompanying drawings, in which:

Fig. 1 is a side elevational view, in quarter section, of a swivel joint and embodying my invention;

Figs. 2 and 3 are respective left and right end views of the joint shown in Fig. 1; and Fig. 4 is a fragmentary cross sectional view of a sealing means employed in the invention.

In the embodiment of the invention which is illustrated and which is intended as exemplary only of the invention, the swivel joint may be said to comprise, generally, an outer component 10 including a tubular housing 11 and a coupling 12; an axially inner or central section in the nature of a nipple 13 extending into the chamber 14 of said housing 11 and formed with a central fluid passage 15; anti-friction means 16 interconnecting the outer component 10 and the nipple 13; means 17 for introducing lubricant into the chamber 14 for lubricating the anti-friction means 16; means 18 for sealing between the outer component 11 and the nipple 13 to prevent lubricant leakage from the chamber 14 outwardly at one end of the housing joint; and means 19 for sealing between said outer component and said nipple to prevent fluid in the passage 15 from entering said chamber 14 to foul the anti-friction means 16.

The swivel joint and its elements may be made and fabricated in various ways. I prefer to form the housing 11 and the coupling 12 as simple fine sand or die castings, and to form the nipple 13 as a casting machined all over or to form it from a length of suitable heavy pipe or tubing. Pressure conditions, type of fluid handled by the swivel joint, and other such factors will determine the material used in the joint elements and the manner of their production and fabrication.

The housing 11 has a generally cylindrically tubular outer wall or body 20. A flat transverse end wall 21 is provided at one end of the body and is formed with an outwardly directed central boss 22. A central axial opening 23 extends through said wall 21 and boss 22. The other or open end of the tubular body 20 opposite to the end wall 21, is shown as internally threaded at 24 for reception of mating threads on the periphery of a transverse end plate part 25 which carries the coupling 12.

The coupling 12, includes an outwardly directed central boss 26 which is internally and axially threaded at 27 for connection to a pipe line in which the swivel is placed. I also show opposed flats 28 on the boss 26 for the application of a tool to facilitate such connection. I provide means for preventing inadvertent relative rotation resulting in longitudinal separation of the housing 11 and coupling 12. I show such means as including a lock ring 29 in a groove 30 formed in the outer surface of the housing wall 20 adjacent its open end. The ring has inreaching ends 31 disposed in a common seat 32 in the housing 11 and the coupling 12.

The nipple 13 is centrally and longitudinally arranged in the outer component 10 and extends through the center of the chamber 14 whereby said chamber has an annular shape. The nipple 13 has an outwardly projecting cylindrical outer end portion 35 loosely fitting the opening 23 and externally threaded at its outer end 36 for connection to a pipe line. Such connection is facilitated by the provision of opposed flats 37 on the exposed part of the nipple portion 35. The nipple 13 is further provided with a central enlarged portion 38 located in the chamber 14 and with a reduced inner end part 39 directed toward the threaded opening 27 and projecting into and freely fitting a bore 40 in the inner end of coupling 12. The fluid passage 15 extends longitudinally through the nipple 13 and is in communication with the coupling 12.

The anti-friction means 16 is arranged within the chamber 14 and interconnects the outer component 10 and the nipple 13. Said means 16 is shown as a radial ball bearing 41 having its outer race 42 fitted in a seat 43 in the body and its inner race 44 fitted on a seat 45 on the central portion 38 of the nipple. The outer component 10 and the nipple 13 are, thereby, connected for relative rotation. Relative endwise or longitudinal movement of ball bearing 41 and the housing 10 is prevented by a transverse abutment shoulder 46 formed in the body 20 and engaged with one end of the bearing race 42 and a spacing ring 47 engaged between the other end of said bearing race 42 and the end plate part 25. Similar endwise movement of the ball bearing 41 with relation to the nipple 13 is prevented by a shoulder flange 48 on the nipple between the nipple portions 38 and 39 and engaged with one end of the bearing race 44, and a retaining snap ring 49 in a groove 50 in the nipple and engaged with the other end of said bearing race 44.

Lubricant for the ball bearing 41 may be introduced into the chamber 14. For this purpose I provide the means 17 which I have shown as including a pressure grease fitting 51 mounted in a radial threaded hole 52 in the body 20 of the housing 11 and between the end wall 21 and the ball bearing 41. It will be noted that the shoulder wall 46 is spaced from the end wall 21 of the housing and that the spacing ring 47 is of substantial width. Accordingly, the chamber 14 is considerably wider than the ball bearing 41 to provide a large lubricant storage space. This makes it possible to operate the joint for a very long time with assurance that the bearing is well lubricated.

The sealing means 18, which I show as a seal ring 53 is carried in an annular groove 54 in the nipple and engages the wall of opening 23. The ring 53 serves to prevent lubricant leakage from the chamber 14 outward through said opening 23. The seal ring 53 also functions to prevent dust and grit from entering the chamber 14 and, therefore, serves to protect the ball bearing against undue wear.

The sealing means 19 serves to prevent lubricant from leaking from the chamber 14 into the fluid passage 15 and has the additional, more important function, of preventing fluid in said passage from entering the chamber 14. I show the means 19 as including a packing ring 55 which I mount in and preferably bond to, a channel shaped metal ring 56. I provide a central annular recess or counterbore 57 in the end plate 25 and I position said sealing means 19 in the counterbore 52 to seal between the outer component 10 and the nipple 13. The ring 55 engages the outer cylindrical surface of the nipple extension 39 and the opposed cylindrical wall 58 of the recess 57. The spacing ring 47 has a transverse disc portion 59 which covers or closes the recess 57 to hold the ring 55 therein.

It will be seen that the sealing means 18 and 19 are of relatively small diameter with respect to the diameter of the ball bearing 41 and of the housing 20. Highly efficient sealing action is gained by said means 18 and 19 by reason of their small diameter, the structure being designed to provide sealing means which are only as large in diameter as is necessary with relation to the size of the fluid passage 15.

The packing ring 55 of the sealing means 19 is of novel design and is made of formable and compressible material such as natural or synthetic rubber. Said ring is formed with outer and inner annular and laterally directed sealing flanges or lips 60 and 61, respectively, and a central annular and laterally directed pressure and fluid diverting flange 62 defining outer and inner annular recess 63 and 64 between said central flange 62 and the respective sealing lips 60 and 61. The sealing lips are preferably feathered at their outer edges as best shown in Fig. 4. The portion 65, opposed to the parts 60, 61 and 62 is reduced in size to fit into the channel ring 56 so that the normally divergent walls 66 and 67 of the ring 55 comprise extensions of the flange walls 68 and 69 of said ring 56.

It will be noted that the bearing 41, sealing ring 18 and the packing ring 55 form the only physical connection between the relatively rotational components of the swivel joint. By the use of a single ball bearing, free swiveling action is obtained without the need for accurate aligning fits between the components of the joint. Accordingly, the present swivel joint has limited relative angular movement with respect to the longitudinal axis of the joint as permitted by the "play" or rocking action that may occur at the ball bearing. Such angular movement as may occur between the housing 10 and the nipple 13, is amply compensated for in the sealing ring 53 by providing a feathered annular flange 70 on said ring 53 which is inwardly compressed by the annular wall of the opening 23. Since high pressures are not involved at this sealing point, said feathered flange 70 will, at all times seek and obtain sealing engagement with said opening 23. The feathered flanges 60 and 61 of the sealing means 19 function in a similar manner. However, in this case, high pressure fluid seeking to enter the chamber 14 from the passage 15, will press into the grooves 63 and 64 first, to firmly seat the sealing means 19 against the disc 59 and second, to urge said feathered lips 60 and 61 into firm and leakproof engagement with the groove wall 58 and the cylindrical outer wall of the nipple portion 39, respectively. The flange 62 serves as a pressure diverting member affording substantially direct application of pressure upon said feathered lips 60 and 61. It will be seen that the higher the pressure upon the sealing means 19, the more efficient will be its sealing action. While I intend the fluid flow through the swivel joint to be in a left to right direction as seen in Fig. 1, the joint will function efficiently in a line in which the flow is in the opposite direction or in which the flow may be alternately in both directions.

Having described only a typical preferred form and application of my invention, I do not wish Having described my invention, I claim:

1. A swivel connection of the character described including, a central tubular section with accessible coupling means at its outer end, an outer section including a tubular body surrounding the central section, a fixed end at one end of the body surrounding the central section with substantial clearance and passing the said outer end of the central section and a detachable end at the other end of the body surrounding the central section with substantial clearance, an antifriction bearing within the body between the ends rotatably supporting the central section in the outer section, sealing means between the central section and the ends of the outer section, and an accessible coupling carried by the detachable end and projecting outwardly therefrom, the outer end of the central section projecting outward through the fixed end of the outer section to be exposed beyond the fixed end of the outer section, the inner end of the central section terminating in the structure formed by the detachable end of the outer section and the coupling carried thereby.

2. A swivel connection of the character described including, a central tubular section having coupling means on its outer end, an outer section including a tubular body surrounding the central section, a fixed end projecting radially inward from one end of the body and having a bore freely passing said end of the central section and a detachable end projecting radially inward from the other end of the body and fitting freely around the inner end of the central section and having an axial projection beyond the inner end of the central section forming a coupling, an antifriction bearing in the body rotatably supporting the central section, a sealing ring confined against axial movement in both directions in an annular recess in the central section and sealing outwardly in said bore, and a sealing ring carried by the detachable end and bearing inwardly against the central section, the other end of the central section terminating within the detachable end of the outer section.

DOYLE C. WARREN.

REFERENCES CITED

The following references are of record in the file of this patent:

UNITED STATES PATENTS

| Number | Name | Date |
|---|---|---|
| 2,269,431 | Allen et al. | Jan. 13, 1942 |
| 2,356,351 | Phillips | Aug. 22, 1944 |
| 2,396,123 | Phillips | Mar. 5, 1946 |